United States Patent [19]
Giorgini et al.

[11] Patent Number: 5,976,371
[45] Date of Patent: Nov. 2, 1999

[54] WHITE-OPALESCENT ADHESIVES FOR THE PREPARATION OF BONDED FILTERS

[75] Inventors: Albert M. Giorgini, Maplewood; James A. Hagquist, St. Paul, both of Minn.

[73] Assignee: H.B. Fuller Licensing & Financing, Inc., St. Paul, Minn.

[21] Appl. No.: 08/987,230

[22] Filed: Dec. 9, 1997

[51] Int. Cl.$^6$ .................................................. B01D 63/00
[52] U.S. Cl. .................... 210/321.61; 156/106; 156/305; 264/DIG. 48
[58] Field of Search .............................. 210/493.2, 323.1, 210/323.2, 321.61; 156/304.6, 305, 106; 528/58; 264/DIG. 48

[56] References Cited

U.S. PATENT DOCUMENTS

| | | | |
|---|---|---|---|
| 3,715,337 | 2/1973 | Allen et al. | 528/49 |
| 3,897,410 | 7/1975 | Olstowski et al. | 524/792 |
| 3,901,852 | 8/1975 | Shah . | |
| 4,210,067 | 7/1980 | Evans, Jr. . | |
| 4,227,953 | 10/1980 | Wasielewski et al. . | |
| 4,332,927 | 6/1982 | Simone | 528/58 |
| 4,532,316 | 7/1985 | Henn . | |
| 4,976,857 | 12/1990 | Solomon . | |
| 5,024,870 | 6/1991 | Jackson | 428/181 |

FOREIGN PATENT DOCUMENTS

| | | |
|---|---|---|
| 42 08 862 | 9/1993 | Germany . |

*Primary Examiner*—W. L. Walker
*Assistant Examiner*—Terry K. Cecil
*Attorney, Agent, or Firm*—Nancy N. Quan; Carmen Pili Curtis

[57] ABSTRACT

The present invention discloses two-part isocyanate-based adhesive compositions, free of inorganic pigments and fillers, which cure to form polyurethane-based adhesives having an opaque-white appearance greater than about L* 80 and a shore A hardness greater than about 50. Such materials are particularly useful for the preparation of bonded filter. The invention further describes a method for the preparation of bonded filters using these compositions and the bonded filters thereof. Additionally, these compositions can also be used as two part general household adhesives and/or caulkings wherein the two liquid parts are metered together just prior to application using a dispensing apparatus including, but not limited to, glue guns having two containers (e.g., tubes); one tube, for example, containing polyol and diol components and the second containing polyisocyanate.

16 Claims, No Drawings

WHITE-OPALESCENT ADHESIVES FOR THE PREPARATION OF BONDED FILTERS

FIELD OF THE INVENTION

This invention relates to polyurethane-based adhesives, specifically to two-part isocyanate-based compositions which are useful for the preparation of bonded filters and the like, as well as adhesives in other applications including Thermal-Brake™, adhesives and sealants used for the manufacture of windows, two-part general household adhesives and caulkings.

BACKGROUND OF THE INVENTION

It is known that two-part isocyanate-based adhesives can be used to bond natural and synthetic materials including paper, metals and plastics. The two-part adhesives generally consist of polyols and polyisocyanates, often mixed immediately before the bonding process, which cure to form polyurethane-based adhesives. Several references are described below:

U.S. Pat. No. 3,901,852 (Shah) discloses polyurethane-based elastomers comprising the reaction product of 4,4'-methylenebis (phenyl isocyanate), polyethylene glycols and aliphatic straight chain diols. The elastomers are formed using a one-shot procedure in which all the reactants are brought together simultaneously before the bonding process. Shah has found that by controlling the proportion of polyethylene glycol to extender within very carefully defined limits and by employing certain extenders in combination with the polyethylene glycols, it is possible to obtain thermoplastic polyurethanes that possess all the desirable structural strength properties of those elastomers currently available. U.S. Pat. No. 3,901,852 (Shah) fails to teach or suggest two-part isocyanate-based adhesive compositions, using a one-shot procedure, which phase-separate during the curing process to form highly-opaque white polyurethanes.

U.S. Pat. No. 4,532,316 (Henn) discloses phase separating polyurethane prepolymers and elastomers prepared by reacting a polyol having a molecular weight of 600–3500, isocyanate and a low molecular weight chain extender wherein the ratios of reactants have an isocyanate index of greater than or equal to 1.1. The prepolymers phase separate and form a highly-opaque white solid having excellent storage stability. Henn further describes a method for the preparation of polyurethane elastomers wherein the prepolymers are reacted with low molecular weight chain extenders. In the most preferred embodiment, the prepolymers of the invention are prepared by slow addition of polyol to liquid diisocyanate in such a manner as to favor a narrow molecular weight distribution of isocyanate terminated prepolymer, followed by the addition of the deficiency of chain extender. The two-part isocyanate-based adhesive compositions require a complicated and costly preformation of a solidified prepolymer which requires a melting process prior to its application.

German Patent application DE 42 08 862 A1 (Boehnke) discloses a filter element and a process for its production wherein the adhesive is preferably a hot melt adhesive, but can also be a two-component or a one-component adhesive; materials exemplified are polyamide or polyurethane adhesives. This reference does not disclose any details of how the two-component polyurethane adhesive is formed or any of its physical properties.

Other related patents which describe the preparation of filters include: U.S. Pat. No. 4,210,067 (Evans, Jr.); U.S. Pat. No. 4,227,953 (Wasielewski et al.); and U.S. Pat. No. 4,976,857 (Solomon).

In the manufacture of bonded filters, it is desirable to have an adhesive which closely matches the white appearance of the filter media. Adhesives having a highly-opaque white appearance are often formed by the addition of inorganic pigments and/or fillers. Examples of commonly used inorganic pigments and/or fillers include titanium dioxide, antimony oxide, zinc oxide, magnesium silicate (talc), calcium sulfate, barium sulfate, zinc borate, anhydrous sodium potassium alumina silicate, calcium sulfate and calcium carbonate. Such materials are not, however, desirable for the adhesives' appearance and processing characteristics. Specifically, these materials often settle, prior to the meter-mix process, making the adhesive appear less uniform in color. Although sedimentation may be controlled by the addition of thickening agents, such additives can further adversely affect the flow characteristics, resulting in reduced fiber penetration and bond strengths. Another disadvantage associated with white adhesives having inorganic pigments and/or fillers relates to the adhesives' abrasive characteristics in that such materials often wear down mechanical parts within the meter-mix and/or dispensing equipment.

The present inventors have now discovered a two-part polyurethane adhesive system that possesses a white-opalescent appearance without the addition of any filler or pigments.

SUMMARY OF THE INVENTION

The present invention describes isocyanate-based adhesive compositions, which are free of inorganic pigments and/or fillers but which cures to a white opalescent appearance. It is surmised that the materials phase-separate during the curing process to form a white adhesive. The adhesives are also characterized as having low initial viscosities, allowing enhanced penetration into the porous filter media when used in filter preparation, and cure to form polyurethane-based adhesives having good mechanical properties and bond strengths. For example, lower initial viscosities enhance potting characteristics in that such materials readily flow into the intricate pleated folds of the filter media and into the end-cap designs used in the preparation of bonded filters. Additionally, lower initial viscosities often result in optimum fiber penetration and increased bond strengths through mechanical interlocking, once the adhesive composition has cured.

The present invention is directed to two-part isocyanate-based adhesive compositions, preferably comprising:
 a) the reaction product of:
  i) at least one polymeric polyol component; and
  ii) at least one alkylene diol component; and
 b) at least one polyisocyanate component.

The reaction rates of said at least one polymeric polyol component and said at least one alkylene diol component are sufficiently different to generate phase separation during curing.

Additionally, or in the alternative, the present invention is further directed to two-part isocyanate-based adhesive compositions comprising the reaction product of:
 a) at least one polymeric polyol component comprising a high MW triol; and
 b) at least one polyisocyanate component,
  wherein said high MW triol has sufficiently different intrinsic reaction rates to generate phase separation during curing.

Preferably, the parts are liquid at ambient room temperatures. Such parts are generally easier to process in that the addition of heat is not required prior to the one-shot process.

Surprisingly, the present inventors have discovered that the components described above react to form polyurethane-based adhesives having an L* white value greater than about 80, without the addition of inorganic pigments and/or fillers. Additionally, the adhesives cure to a Shore A hardness greater than about 60 and provide a more durable and reliable bond in use.

The isocyanate-based adhesive compositions of the present invention are also easily processed on conventional meter-mix equipment, having an initial viscosity less than about 2,000 mPa.s, at 25° C.+/−10° C.

In another aspect, the invention discloses a method for the preparation of bonded substrates, comprising the steps of:
a) providing a mixture of materials comprising:
1) a component A comprising:
  i) at least one polymeric polyol component; and
  ii) at least one alkylene diol component; and
2) a component B comprising at least one polyisocyanate;
b) applying said mixture to a substrate; and
c) curing said adhesive.

The substrate can be wood, glass, ceramic, fiber glass or plastic.

The isocyanate-based adhesives described in the present invention are particularly useful for the preparation of bonded filters. Specifically, the present invention discloses a method for the preparation of bonded filters comprising the steps of:
a) providing a mixture of materials comprising:
1) a component A comprising:
  i) at least one polymeric polyol component; and
  ii) at least one alkylene diol component; and
2) a component B comprising at least one polyisocyanate;
b) applying said mixture to a filter end cap to form a potted material;
c) providing at least one porous filter media; and
d) submerging at least one end of said at least one porous filter media into the potted material and curing.

The uses of these adhesives in other applications include Thermal-Break™, adhesives and sealants used in the manufacture of windows, two-part general household adhesives and caulkings, where white color is advantageous.

DETAILED DESCRIPTION OF THE INVENTION

As mentioned above, specifically, the adhesives are used to manufacture the bonded filters free of inorganic pigments and/or fillers. The term "free", as used herein, is defined as completely void of said materials. The adhesives are characterized as having low initial viscosities, cure to a white opalescence and develop excellent mechanical properties and bond strengths after curing.

At least one polymeric polyol component is used in the present invention. Examples of suitable polymeric polyols include polyester polyols, polyether polyols, polyesterether polyols, polycarbonate polyols, polyurethane polyols, polyacrylate polyols, polycaprolactone polyols, polyesteramide polyols, hydroxyl terminated rubbers and polythioether polyols. Polyether-based polyols are preferred in that such materials often reduce the adhesives' initial viscosity. A reference describing the flow characteristics of polymers can be found in "*Polymer Process Engineering*", Eric A. Grulke, Chapter 8, pp 363–440, Prentice-Hall, N.J., 1994. A suitable commercially available polyether polyol includes Voranol® 222–029 which is a polypropylene-based polyol from Dow Chemical (Midland, Mich.). The polymeric polyols are preferably liquid at ambient room temperatures and can have a hydroxyl number, as determined by ASTM E-222-67 (Method B), in a range of from about 10 mg. KOH/gram material to about 210 mg. KOH/gram material, and preferably from about 40 mg. KOH/gram material to about 110 mg. KOH/gram material. The polymeric polyol component is present in a range of from about 50% by weight to about 95% by weight and preferably from about 80% by weight to about 90% by weight. It is surmised that the polymeric polyol's number average molecular weight distribution can have an effect on the cured adhesive's opalescence. Polyols generally contain a distribution of different molecular weights, such that different fractions of the polyol have different reactivity with the polyisocyanates described herein, with the lower molecular weight polymeric polyols having enhanced mobility and higher reactivity. It is further surmised that such a reaction forms polyurethane polymers having a high concentration of urethane linkages which affects the polymer's light scattering characteristics.

At least one alkylene diol component is preferably used in the present invention. The alkylene diol, which may contain alkoxy groups, can have a hydroxyl number in a range of from about 210 mg. KOHI/gram material to about 1250 mg. KOH/gram material, and preferably from about 950 mg. KOH/gram material to about 1250 mg. KOH/gram material. The hydroxyl value is directly related to the components' molecular weight and generally, as the hydroxyl number increases, molecular weight decreases. Suitable examples of alkylene diols include ethylene glycol, propylene glycol, 1,4-butanediol, 1,6-hexanediol, diethylene glycol, triethylene glycol, 2-ethyl-1,3-hexanediol, dipropylene glycol and polytetramethylene ether glycols. The alkylene diol is present in a range of from about 1% by weight to about 15% by weight, and preferably from about 5% by weight to about 10% by weight. It is surmised that as the alkylene diol component reacts with isocyanates, the resulting hard segments generate phase separation to provide a white-opalescent polyurethane polymer.

The present invention may comprise higher functional polyols having more than 2 hydroxyl groups per molecule. Suitable examples include glycerol, trimethylolpropane, 1,2,4-butanetriol, 1,2,6-hexane triol and polymeric triols. The polymeric triols preferably have hydroxyl numbers in a range from about 10 mg. KOH/gram material to about 210 mg. KOH/gram material. Such materials react with the polyisocyanates to form polyurethane-based adhesives having increased crosslink densities. Higher crosslink densities often increase the adhesives shore A hardness and cohesive strengths, which are highly desirable in filters.

At least one polyisocyanate component is used in the present invention. The polyisocyanate may be linear aliphatic polyisocyanates, branched aliphatic polyisocyanates, cyclic aliphatic polyisocyanates, aromatic polyisocyanates, isocyanate terminated prepolymers and mixtures thereof. A suitable aromatic polyisocyanate includes 4,4'-diphenylmethane diisocyanate (MDI) and a suitable isocyanate terminated prepolymer includes Isonate® 2181 which is an isocyanate terminated prepolymer comprising diphenylmethane diisocyanate and a polyether polyol from Dow Chemical Company (Midland, Mich.). The diisocyanate is present in a range of from about 10% by weight to about 35% by weight, and preferably from about 20% by weight to about 30% by weight.

If desired, a plasticizer may be used to enhance the adhesives' flow properties and flexibility once the components have cured. The plasticizer is preferably free of active hydrogen atoms. The term "active hydrogen atom" refers to hydrogens which display activity according to the Zerewitnoff test as described by Kohlerin, *Journal of American Chemical Society*, Vol. 49, pp 31–81 (1927). Suitable plasticizers may include polymeric resins, elastomers, waxes, oils and their mixtures. A commercially available plasticizer includes Kodaflex™ TXIB plasticizer which is an isobutyrate ester of propionic acid from Eastman Products, Inc. (Kingsport, Tenn.). The plasticizer may be present in a range of from about 1% by weight to about 15% by weight, and preferably from about 5% by weight to about 10% by weight.

Optionally, antioxidants may be used. A suitable antioxidant includes Tinuvin® 1130 which is a substituted hydroxyphenyl benzotriazole from Ciba-Geigy Corporation (Tarrytown, N.J.). Preferably the antioxidants are liquid at room temperature. The antioxidant may be present in a range of from about 0.1% by weight to about 1% by weight, and preferably from about 0.2% by weight to about 0.8% by weight.

If desired, a catalyst is used to accelerate the hydroxyl/isocyanate reaction. Any of the catalysts conventionally employed in the art to catalyze the reaction of an isocyanate with a hydrogen active compound can be employed as long as such catalysts do not catalyze in such a way that they equalize the sufficiently different reaction rates of the different molecular weight fractions. Some examples can be found in Saunders et al., *Polyurethanes, Chemistry and Technology*, Part I, Interscience, New York, 1963, pp 228–232; see also, Britain et al., *Journal of Applied Polymer Science*, Vol. 4, pp 207–211, 1960. A suitable commercially available catalyst includes Formez® UL-32 which is an alkyltin mercaptide from Witco Corporation (Oakland, N.J.). The catalyst may be present in the polyol component in a range of from about 0.01% by weight to about 1% by weight, and preferably from about 0.05% by weight to about 0.10% by weight. Also, if the various molecular weight fractions do not possess sufficiently differing reaction rates, a catalyst that catalyzed one reaction more than another to generate sufficiently different reaction rates can be advantageous.

Other characteristics of the isocyanate-based adhesives can be modified by the addition of materials, which are preferably liquid at room temperature, including UV stabilizers, fungicides, bactericides, perfume-like materials, dyes and fire retardants.

The polyol component and isocyanate component are typically blended together at ambient room temperatures and preferably at a temperature in a range of from about 25° C.+/−10° C. Temperatures outside the preferred range may be undesirable in that a temperature less than about 15° C. often reduces the adhesives' flow properties and reactivity. Alternatively, a temperature greater than about 35° C. often accelerates the hydroxyl/isocyanate reaction resulting in increased viscosities, prior to the application, making the adhesive more difficult to process.

The polyol component and polyisocyanate component can be blended together using a hydroxyl equivalence in a range of from about 0.8 to about 1.3 and an isocyanate equivalence in a range of from about 0.9 to about 1.2. A hydroxyl equivalence outside this range may be undesirable in that a hydroxyl equivalence less than about 0.8 results in a product having a higher concentration of free isocyanate. Excess isocyanate can generate worker safety hazards through inhalation and/or dermal contact. Alternatively, a hydroxyl equivalence greater than about 1.3 may be undesirable in that such an increase can lower the adhesives' weight average molecular weight distribution, thus reducing the adhesives' mechanical properties.

The isocyanate-based adhesives described in the present invention can have initial viscosities less than about 5,000 mPa.s, preferably less than about 2,000 mPa.s, and most preferably less than about 1,000 mPa.s. It is surmised that some of the adhesives' unique properties may be attributed to their low initial viscosities. For example, lower viscosities often improve the adhesives' flow properties allowing deeper penetration into the porous filter media and its folds. It is further surmised that bond strengths are increased, through mechanical interlock, once the adhesive has cured.

The adhesives, which are free of inorganic pigments and/or fillers, cure to L* white value greater than about 60, preferably greater than about 70, and most preferably greater than about 80. The white properties were measured using a Minolta Chroma Meter model CR-331 from the Minolta Camera Co. (Japan). The L* white value is taken from a color Lab-system schematic from BYK-Gardner, Inc. (Silver Spring, Md.) wherein an L* of 100 is the optimum whiteness.

When the isocyanate-based adhesive compositions described in the present invention are potted into a filter end-cap which may consist of natural and/or synthetic materials including wood, metal and plastics, cured white adhesives result. Alternatively, it may be possible to use the polyurethane-based polymer as the filter end-cap. For example, the isocyanate-based adhesives described in the present invention can be shaped into a filter end-cap using a mold or a release liner. Once the adhesive has cured, the end-cap is removed from the mold or release liner and used to form a bonded filter. If desired, such an end-cap can be colored using any of the liquid dyes currently available. The dye is preferably added to the polyol component.

Once the filter has been assembled with the adhesive present, the inventive compositions can be cured at a temperature in a range of from about 0° C. to about 80° C., and preferably from about 25° C. to about 60° C. Ambient room temperatures are most preferred in that additional heating equipment often increases the complexity of the manufacturing process. The cured adhesive can have a shore A hardness greater than about 50, preferably greater than about 65, and most preferably greater than about 85. A higher shore A hardness is preferred, and is often directly related to the enhanced mechanical properties of the adhesives, resulting in a more durable and reliable bond.

The porous filter media used for the preparation of bonded filter are well known and include cellulose type filter media such as paper, polyester, polypropylene, polysulfone and their mixtures.

The isocyanate-based adhesives are formed when the polyol component and isocyanate component are blended together at ambient room temperatures using impingement, static and/or dynamic mixing. The components can be blended together using conventional polyurethane meter-mix equipment. A suitable polyurethane meter-mix unit includes the twin mixer machine type CTF from Liquid Control Corporation (North Canton, Ohio). The unit can meter and dispense the formulations described in the present invention, using mix ratio of polyol component to isocyanate component of about 1:5 to about 5:1 and can have flow rates from about 5 grams/sec. to about 1 gram/sec., using air pressures of from about 4 kg/sq.cm. to about 1 kg/sq.cm.

The inventive adhesives can be transferred using metering pumps which may include centrifugal pumps, diaphragm pumps, gear pumps, piston pumps, peristaltic pumps, progressive cavity pumps, lobe pumps, screw pumps and vane pumps. Alternatively, the isocyanate-based adhesive may be transferred using gravity feed and/or compressed gasses including nitrogen which may require the use of control valves.

The inventive compositions can also be used as adhesives in other applications including Thermal-Brake™, or Full Pour® adhesives and sealants used for the manufacture of windows, available from H.B. Fuller Company (St. Paul, Minn.). Additionally, these compositions can also be used as two part general household adhesives and/or caulkings wherein the two liquid parts are metered together just prior to application using a dispensing apparatus including, but not limited to, glue guns having two containers (e.g., tubes); one tube, for example, containing polyol and diol components and the second containing polyisocyanate.

In this embodiment the appropriate proportions of Component A and Component B are first premixed. The mixture is then forced through an orifice to produce a bead which is disposed upon the surface of the material to be adhered or sealed. Suitable surfaces include those typically used in the manufacture of windows, such as wood and vinyl as well as ceramic and fiber glass materials used for vanity tops, sinks, showers, tubs and toilets.

The present invention is further illustrated by the following non-limiting examples.

The following test methods were used:

Initial Viscosity Testing

The parts were blended together at 25° C. and immediately tested on a Brookfield viscometer Model RVF from Brookfield Engineering Laboratories, Inc. (Stoughton, Mass.), using spindle #2 at 20 rpm.

L* Whiteness Test

A Minolta Chroma Meter model CR-331 from Minolta Camera Co. (Japan) was calibrated using a Minolta calibration plate No. 14133194, to CIE standard illumination D65 conditions, for the Y, X and Z values. The target color select button was set on the channel containing the calibration values for said calibration plate. The cured adhesive was then placed under the unit and measured for an L* white value. The L* white value is taken from a color Lab-system schematic from BYK-Gardner, Inc. (Silver Spring, Md.) wherein an L* of 100 is the optimum whiteness.

EXAMPLE 1

Example 1 describes the preparation and properties of an isocyanate-based adhesive composition used in the invention.

| Polymeric Polyol and Alkylene Diol Components | |
|---|---|
| Voranol ® 222-029 | 89 grams |
| 1,4-butanediol | 10 grams |
| Formrez ® UL-32 | 0.1 grams |

The materials described above were blended together at ambient temperatures, using mechanical agitation. The polyol component had a viscosity of 850 mPa.s.

| Polyisocyanate Component | |
|---|---|
| Isonate ® 2181 | 100 grams |

The polyol and polyisocyanate components described above were blended together, at 25° C. with agitation, using a polyol to isocyanate mix ratio by weight of 2:1. The isocyanate-based adhesive composition had an initial viscosity of 850 mPa.s and within a 2 minute period it cured to an L* white value of 94, showing the utility of the invention.

| | | |
|---|---|---|
| Shore A Hardness | (ASTM D2240) | 90 |
| Tensile Strength | (ASTM D412) | 75.29 kgs/sq cm |
| Elongation | (ASTM D412) | 194% |
| Tear Resistance | (ASTM D624) | 202 |
| Resilience | (ASTM D3374) | 177% |

EXAMPLE 2

Example 2 describes a preferred isocyanate-based adhesive composition of the invention.

| Polymeric Polyol and Alkylene Diol Components | | |
|---|---|---|
| Voranol ® 222-029 | 82.44 grams | |
| Voranol ® 230-660 | 5.00 grams | Polyether polyol from DOW (Freeport, TX) |
| Ethylene glycol | 5.00 grams | |
| Dipropylene glycol | 2.00 grams | |
| Kodaflex ® TXIB | 5.00 grams | |
| Tinuvin ® 1130 | 0.50 grams | |
| Formrez ® UL-32 | 0.06 grams | |

The materials described above were blended together at ambient temperatures using mechanical agitation. The polyol mixture had a viscosity of 600 mPa.s.

| Polyisocyanate Component | | |
|---|---|---|
| Rubinate ® 1790 | 95.00 grams | NCO-terminated prepolymer from ICI (Sterling Heights, MI) |
| Kodaflex ® TXIB | 5.00 grams | |

The materials described above were blended together at ambient temperatures using mechanical agitation. The isocyanate component had a viscosity of 790 mPa.s.

The polyol and isocyanate components described above were blended together, at 25° C. with mechanical agitation, using a polyol to isocyanate mix ratio of 2:1 by volume. The resulting blend had an initial viscosity of 800 mPa.s and within a 2 minute period it cured to an L* white value of 92, showing the utility of the invention.

What is claimed is:

1. An adhesive composition comprising the reaction product of
   a) at least one polymeric polyol component present in a range of from about 50% to about 95%;
   b) at least one alkylene diol component present in a range of from about 1% to about 15%; and
   c) at least one polyisocyanate component present in a range of from about 10% to about 35%, the percentages being by weight relative to components (a), (b) and (c);
   wherein said composition is free of inorganic pigments and fillers and said components react to form a polyurethane-based adhesive having an L* white value greater than about 60.

2. The composition as described in claim 1, wherein the components react to form a polyurethane-based adhesive having an L* white value greater than about 80.

3. The composition as described in claim 1, wherein the polymeric polyol component comprises a distribution of different molecular weights having sufficiently different reactivities.

4. The composition as described in claim 1, wherein the polymeric polyol component is a polyether-based polyol.

5. The composition as described in claim 1, wherein the alkylene diol has a hydroxyl number in a range of from about 950 milligrams potassium hydroxide per gram material to about 1250 milligrams of potassium hydroxide per gram material.

6. The composition as described in claim 1, wherein the alkylene diol is selected from the group consisting of ethylene glycol, propylene glycol, 1,4-butanediol, 1,6-hexanediol, diethylene glycol, triethylene glycol, 2-ethyl-1,3-hexanediol, dipropylene glycol, polytetramethylene ether glycol and mixtures thereof.

7. The composition as described in claim 1, wherein the polyisocyanate component is selected from the group consisting of linear aliphatic polyisocyanates, branched aliphatic polyisocyanates, cyclic aliphatic polyisocyanates, aromatic polyisocyanates, isocyanate terminated prepolymers and mixtures thereof.

8. The composition as described in claim 1, wherein the blended components have an initial viscosity less than about 2,000 mPa.s at ambient room temperatures.

9. The composition as described in claim 1, wherein the polyurethane-based adhesive has a shore A hardness greater than about 50 when cured.

10. A method for sealing a substrate comprising the steps of:
    a) providing an adhesive composition of claim 1;
    b) applying said composition to a substrate; and
    c) curing said adhesive.

11. The method as described in claim 10 wherein said bonded substrate is a window.

12. The composition as described in claim 1 wherein the polymeric polyol has a hydroxyl number as determined by ASTM G-222-67 (method B) of about 10 mg KOH/gram material to about 210 mg KOH/gram material.

13. The composition as described in claim 1 wherein the alkylene diol has a hydroxyl number in the range of from about 210 mg KOH/gram material to about 1250 mg KOH/gram material.

14. The composition as described in claim 1 wherein the blended components have an initial viscosity of less than about 5,000 mPa.s at ambient room temperatures.

15. A filter comprising a porous filter media bonded to a filter end-cap, wherein the filter media is bonded to the filter end-cap with the adhesive of claim 1.

16. A method for the preparation of bonded filters comprising the steps of:
    a) applying the adhesive composition of claim 1 to a filter end-cap to form a potted material,
    b) providing at least one porous filter media; and
    c) submerging at least one end of said at least one porous filter media into the potted material and curing.

* * * * *